United States Patent Office 3,457,200
Patented July 22, 1969

3,457,200
URETHANE FOAMS
Frank E. Critchfield, South Charleston, and Robert D. Whitman, St. Albans, W. Va., assignors to Union Carbide Corporation, a corporation of New York
No Drawing. Filed Jan. 15, 1965, Ser. No. 425,945
Int. Cl. C08g 22/06, 22/26
U.S. Cl. 260—2.5                                    4 Claims

ABSTRACT OF THE DISCLOSURE

There is described improved flexible polyether-based urethane foams that are prepared by reacting, in the presence of a blowing agent, a polyether polyol with an organic polyisocyanate. The improvement resides in the use of an organic isocyanate that is the reaction product of tolylene diisocyanate with a diol selected from the group consisting of dipropylene glycol, tripropylene glycol, dibutylene glycol, 2,2-dimethyl-3-hydroxypropyl 2,2-dimethyl-3-hydroxypropionate, 2 - methyl-2-hydroxymethylbutyl 2-methyl-2-hydroxymethylbutyrate, and mixtures thereof.

---

This application is a continuation-in-part of applicants' copending application Serial No. 419,600, filed December 18, 1964.

The invention relates to an improvement in the art of urethane foams. In a particular aspect, the invention relates to an improved process for making polyether-based flexible urethane foams wherein the improvement resides in the use of the reaction product of tolylene diisocyanate and one or more of certain low molecular weight diols as the isocyanate reactant in producing urethane foams. The invention also relates to the improved urethane foams that are produced by the process of the invention.

Flexible polyether-based urethane foams are commercially produced by reacting a high molecular weight polyether polyol with an organic polyisocyanate in the presence of a blowing agent which is usually water or water plus a small amount of halocarbon. A typical formulation includes as the polyol a polyoxypropylene diol or triol or both having an average molecular weight of from about 2000 to 6000. The organic polyisocyanate is normally tolylene diisocyanate. Such urethane foams have found wide utility in producing cushions, padding, and the like. However, the uses of polyether-based urethane foams could be expanded further if certain of the mechanical properties, for instance tensile strength, could be improved by economical means. It has been proposed to improve the mechanical properties of flexible polyether urethane foam by adding to the formulation a low molecular weight alcohol such as glycerol, ethylene glycol, diethylene glycol, or the like. While this can have the effect of upgrading some mechanical properties, there are disadvantages introduced which preclude the use of such a method on a commercial scale. The principal disadvantage is that a foam formulation that contains enough low molecular weight alcohol to have a noticeable effect on ultimate foam properties is excessively reactive. The presence of the low molecular weight alcohol increases the average hydroxyl number of the polyol to well over 100. The reaction between alcohol and isocyanate (the principal polymer-forming reaction) then proceeds so rapidly that it is thrown out of balance with respect to the isocyanate-water reaction which causes foaming. This results in closed cells. Certain expedients can be employed to open up the foam cells. First, the tin catalyst level can be lowered, but this causes internal splits before the cells are opened. Second, the addition of N,N-dimethyl-formamide (DMF) to the foam formulation will open up the cells. However, when enough DMF is added to open up the cells, the foam collapses instead. It has therefore proved to be impracticable to upgrade the properties of flexible polyether-based urethane foam produced by the one-shot method by the simple expedient of adding a low molecular weight alcohol such as glycerol or ethylene glycerol to the formulation.

The present invention is based upon the surprising and unexpected discovery that the reaction product of tolylene diisocyanate and certain low molecular weight diols can be readily employed as the isocyanate portion of a flexible polyether-urethane foam formulation, and that the properties of the flexible urethane foams thereby produced are superior in many respects to the foam heretofore commercially available. Thus the invention comprises a method for producing flexible urethane foams which comprises reacting a polyether polyol with an organic polyisocyanate in the presence of a blowing agent wherein the organic polyisocyanate is the reaction product of an excess of tolylene diisocyanate and a diol, said diol being one or more dipropylene glycol, tripropylene glycol, dibutylene glycol, 2,2-dimethyl-3-hydroxypropyl 2,2-dimethyl-3-hydroxypropionate, or 2-methyl-2-hydroxymethylbutyl 2-methyl-2-hydroxymethyl butyrate. Dipropylene glycol is the common name for bis(2-hydroxy-2-methylethyl) ether, tripropylene glycol is 1,2-bis(2-hydroxy-2-methylethoxy)-2-methyl-ethane, and dibutylene glycol is bis(2-hydroxy-2-ethylethyl)ether. These compounds and their preparation are well known in the art.

The polyether polyols employed in the invention are alkylene oxide adducts of compounds that contain two or more, usually from two to three, reactive hydrogens. Such compounds are referred to in the art as "starters," and are usually amines, alcohols, aminoalcohols, or water. Examples of useful starters include water, ethylene glycol, diethylene glycol, propylene glycol, dipropylene glycol, butylene glycols, glycerol, 1,2,6-hexantriol, 1,2,4-butanetriol, 1,1,1-trimethylolethane, 1,1,1,-trimethylolpropane, methylamine, ethylamine, diethanolamine, diisopropanolamine triethanolamine, triisopropanolamine, aniline, pentaerythritol, and others. Preferred starters include water, alkanediols such as propylene glycol, alkanetriols such as glycerol, dialkylene glycols such as diethylene glycol and dipropylene glycol, and the like.

The alkylene oxides employed to produce the polyether polyols employed in the invention are normally those that contain from two to four carbon atoms such as ethylene oxide, propylene oxide(1,2-epoxypropane), 1,2-butylene oxide, 2,3-butylene oxide, isobutylene oxide, tetrahydrofuran, and the like. Propylene oxide and mixtures of propylene oxide with ethylene oxide are preferred.

The polyether polyols are produced by reacting the starter with alkylene oxide in the presence of a catalyst such as potassium hydroxide. The proportions of the reactants is adjusted so that the polyether polyol will have a hydroxyl number in the desired range to produce flexible urethane foams. As is well known in the art, the hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{m.w.}$$

where

OH=hydroxyl number of the polyol
$f$=average functionality, that is, average number of hydroxyl groups per molecule of polyol
$m.w.$=average molecular weight of the polyol.

The polyether polyol, which can be a mixture of two or more polyols as well as one polyol, preferably has a hydroxyl number in the range of from about 40 to about 80, and more preferably in the range of from about 50 to about 70. Hydroxyl numbers within these ranges are preferred for the production of flexible urethane foams.

The isocyanate employed in the invention is the reaction product of an excess of tolylene diisocyanate and a diol that can be one or more of dipropylene glycol, tripropylene glycol, dibutylene glycol, 2,2-dimethyl-3-hydroxypropyl 2,2-dimethyl-3-hydropropionate, or 2-methyl-2-hydroxymethylbutyl 2-methyl-2-hydroxymethylbutyrate. The tolylene diisocyanate employed is normally a mixture of 2,4- and 2,6-tolylene diisocyanate, with the 80/20 mixture of 2,4- and 2,6-tolylene diisocyanate being especially preferred. The preferred method for producing the isocyanate used in the invention is to slowly add the diol to the tolylene diisocyanate, thereby maintaining at all times an excess of isocyanato to hydroxyl groups. The temperature of the reaction can be varied over a wide range, for instance, from about 20° C., and lower, to about 100 C., higher. The preferred reaction temperature is in the range of from about 25° C. to about 80° C. The reaction time depends, in part, upon factors such as temperature, nature and proportion of the reactants, and the like. For instance, the diol addition time can be from about 1 hr. to about 5 hrs., and the addition can be followed by a subsequent reaction period which can be from about one-half hour to about six hours. One desirable method for producing the isocyanate is to slowly add the diol to the tolylene diisocyanate with the reactants being at about room temperature (i.e., about 25° C.,), and to allow the reaction mixture to rise to about 80° C. The reaction is then maintained at about 80° C. for a period of about two hours, and is then cooled to room temperature.

The molar ratio of tolylene diisocyanate:diol is at least 2:1 and as high as about 6:1. Preferred molar ratios of tolylene diisocyanate:diol are found in the range of from about 3:1 to about 5:1. While higher ratios than 6:1 can be employed, if desired, the beneficial effect begins to diminish as less diol is employed. At ratios close to 2:1, the viscosity of the isocyanate becomes very high which makes processing difficult. The best balance of (1) low viscosity to enable easy processing and (2) enhancement of properties due to the presence of the diol, has been found in the said preferred range of from about 3:1 to about 5:1.

The tolylene diisocyanate:diol reaction product contains both isocyanato and urethane groups. Since reaction between the isocyanato and the hydrogens in the urethane groups can occur, it is desirable to stabilize the reaction product. Benzoyl chloride has been found to be an excellent stabilizer, although other stabilizers known to the art can be employed if desired. The stabilizer is employed in amounts sufficient to substantially inhibit the reaction of isocyanato with urethane hydrogen. Excessive amounts of stabilizer are preferably avoided so that it will be unnecessary to employ relatively large amounts of catalyst during the foaming reaction. Stabilizer concentrations of from about 0.02 weight percent to about 1 weight percent can be used. Preferred concentrations of stabilizer are in the range of from about 0.05 to about 0.15 weight percent. Percentages are based upon weight of tolylene diisocyanate-diol reaction product.

The urethane foams of the invention are produced by reacting the polyether polyol with the tolylene diisocyanate-diol (TDI-diol) reaction product in the presence of a blowing agent. The TDI-diol is usually employed in a stoichiometric excess with respect to the reaction hydrogens contributed to the foam formulation from the polyether polyol and any water that is present. A five to ten percent excess of isocyanato over reactive hydrogens is frequently employed, although other ratios can be employed if desired.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbon which have boiling points between about −40° C. and 70° C., and which vaporize at or below the temperature of the foaming mass. Illustrative are, for example, trichloromonofluoromethane,
dichlorodifluoromethane,
dichloromonofluoromethane,
dichloromethane,
trichloromethane,
bromotrifluoromethane,
chlorodifluoromethane,
chloromethane,
1,1-dichloro-1-fluoroethane,
1,1-difluoro-1,2,2-trichloroethane,
chloropentafluoroethane,
1-chloro-1-fluoroethane,
1-chloro-2-fluoroethane,
1,1,2-trichloro-1,2,2-trifluoroethane,
1,1,1-trichloro-2,2,2-trifluoroethane,
2-chloro-1,1,1,2,3,3,4,4,4-nonafluorobutane,
hexafluorocyclobutene, and
octafluorocyclobutane.

Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N′-dimethyl-dinitrosoterephthalamide.

The amount of blowing agent used will vary with the density desired in the formed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts are normally employed in the foam reaction mixture for accelerating the isocyanate-reactive hydrogen reaction. Such catalysts include a wide variety of compounds such as, for example:

(a) Tertiary amines such as trimethylamine,
triethylamine,
N-methylmorpholine,
N-ethylmorpholine,
N,N-dimethylbenzylamine,
N,N-dimethylethanolamine,
N,N,N′,N′-tetramethyl-1,3-butanediamine,
triethanolamine,
1,4-diazabicyclo[2.2.2]octane,
1,2,4-trimethylolpiperazine,
bis(dimethylaminomethyl)amine,
N,N,N′,N′-tetraalkyl-1,3-propanediamine,
bis[2-(N,N-dimethylamino)ethyl]ether, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example sodium acetate potassium laurate calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin, dilaurate, dibutyltin maleate, dilauryltin diacetate, dioctyltin, diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dicotyltin dicholride, and the like.

The tertiary amines may be used as primary catalysts for accelerating the reactive hydrogen/isocyanate reaction or, more preferably, as secondary catalysts in combination with one or more of the above-noted metal catalysts. Metal catalysts, or combinations of metal catalysts, may also be employed as the accelerating agents, without the use of amines. The tin catalysts are the preferred metal catalysts, particularly stannous octoate. The catalysts are employed in small amounts, for example, from about 0.001 percent to about 5 percent, based on weight of the reaction mixture.

In producing foamed reaction products, it is also within the scope of the invention to employ small amounts, e.g., about 0.001% to 5.0% by weight on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers include such materials as polyethoxylated vegetable oils, commercially available as "Selectrofoam 6903," "Empulphor EL-720," and others. Although the use of an emulsifier is desirable to influence the type of foam structure that is formed, the foam products of the invention can be prepared without emulsifiers in some cases.

In some cases it may be desirable to include a small amount of N,N-dimethylformamide (DMF) in the foam reaction mixture. The DMF acts to extend the useful range of foaming catalyst concentration so that the concentration above which closed cells occurs is not critically close to the concentration below which foam collapse occurs. Up to about 10 weight percent DMF (based on weight of polyether polyol) is usually sufficient for this purpose.

The flexible urethane foams of the invention are useful in the production of cushions, padding, insulation, sponges, and the like. The urethane foams of the invention have enhanced utility because of their improved properties, especially tensile strength, tear strength, elongation, load bearing properties, and other mechanical properties.

The examples which follow illustrate various aspects of the invention. The tolylene diisocyanate employed in the examples was an 80–20 mixture of 2,4- and 2,6-tolylene diisocyanate. Parts are by weight unless otherwise specified.

Example 1

A TDI-diol reaction product was produced by reacting dipropylene glycol with tolylene diisocyanate in a molar ratio of TDI:diol of 4:1. The dipropylene glycol (100.6 pounds) was slowly added to the tolylene diisocyanate (522.5 pounds heated to 65° C.) over a period of 3.5 hours. The reaction temperature was permitted to rise from about 65° C. to about 80° C. during the addition of the dipropylene glycol. The reaction mixture was maintained at 80° C. for 3 hours after the addition and was then cooled to room temperature. The final product was a liquid that had a Brookfield viscosity of 350 centipoises at 25° C.

Several urethane foams were produced by the one-shot, hand batch technique from the tolylene diisocyanate-dipropylene glycol reaction product described above. The properties of these foams and their formulations are compared below with those of a conventional flexible urethane foam.

TABLE I.—FOAM FORMULATIONS

| Component | Parts by weight | | | |
| --- | --- | --- | --- | --- |
| | A | B | C | D |
| Polyol A [1] | 100 | 50 | 100 | 50 |
| Polyol B [2] | | 50 | | 50 |
| Water | 4 | 4 | 2.8 | 2.8 |
| Stannous Octoate | 0.6 | 0.6 | 0.6 | 0.6 |
| Bis[2-(N,N-dimethylamino)-ethyl] ether | 0.2 | 0.2 | 0.2 | 0.05 |
| Emulsifier A [3] | 2.0 | 2.0 | 2.0 | 2.0 |
| TDI-dipropylene glycol reaction product | 78.5 | 78.5 | | |
| Tolylene diisocyanate | | | 50 | 50 |
| N,N-dimethylformamide | 10 | 10 | 6 | 2.0 |

[1] Propylene oxide adduct of glycerol, having a hydroxyl number of 56.
[2] Polypropylene glycol having a molecular weight of about 2000.
[3] A polysiloxane-polyoxyalkylene block copolymer of the formula:

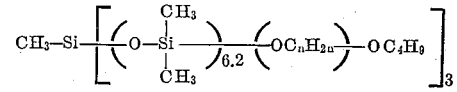

wherein the $\mathrm{+OC_nH_{2n}+}$ moiety represents a polyoxyethyleneoxypropylene group containing an average of about 18 oxyethylene groups and about 14 oxypropylene groups.

Representative physical properties of these three foams are displaced in the following table:

TABLE II.—FOAM PROPERTIES

| Property | Foam | | | |
| --- | --- | --- | --- | --- |
| | A | B | C | D |
| Rise time, seconds | 100 | 106 | 58 | 82 |
| Tensile strength, p.s.i | 26.5 | 28.4 | 14.7 | 16.6 |
| Indentation load deflection,[1] pounds/50 in.²: | | | | |
| 25% deflection | 33.1 | 33.2 | 26.6 | 26.2 |
| 65% deflection | 74.6 | 68.8 | 51.6 | 53.4 |
| Tear strength, pounds/inch | 4.0 | 4.2 | 2.3 | 3.0 |
| Elongation, percent | 230 | 260 | 177 | 285 |
| Density, pounds/ft.³ | 1.98 | 1.95 | 2.0 | 1.98 |

[1] ILD specimen size: 13″ x 13″ x 2″.

The load bearing properties, tensile strength, tear strength and elongation of the foams made in accordance with the invention (A and B) are significantly higher than conventional flexible urethane foams (C and D).

Example 2

In view of the advantages found in using TDI-dipropylene adducts as the isocyanate in flexible urethane foam formulations, attempts were made to use other diols in an analogous manner. It was found that the reaction products of tolylene diisocyanate and the following diols (molar ratio of TDI:diol was 4:1) were either solids having melting points substantially higher than room temperature or crystallized to a solid state within a short time, thereby precluding their use in the commercial production of flexible urethane foams:

2-methyl-2-ethyl-1,3-propanediol
2-methyl-2-propyl-1,3-propanediol
2,2,4,4-tetramethyl-1,3-cyclobutanediol
Ethylene glycol
Diethylene glycol
Propylene glycol
1,6-hexanediol
2,4-butylene glycol

Example 3

Urethane foams were produced by the hand batch, one-shot technique from reaction products of tolylene diisocyanate with each of dipropylene glycol, tripropylene glycol, and dibutylene glycol. The reaction products were produced in a manner analogous to that described in Example 1 from a TDI:diol molar ratio of 4:1. The foam formulations and representative properties of the foams are displayed in the following table:

TABLE III

| Component | Diol | | |
|---|---|---|---|
| | Dipropylene glycol | Tripropylene glycol | Dibutylene glycol |
| Polyol A [1] | 50 | 50 | 50 |
| Polyol B [2] | | 50 | |
| Polyol C [3] | 50 | | 50 |
| Water | 4 | 4 | 4 |
| Stannous octoate | 0.55 | 0.90 | 0.425 |
| Bis[2-(N,N-dimethylamino)ethyl] ether | 0.2 | 0.2 | 0.2 |
| Emulsifier A [4] | 2.0 | 2.0 | 2.0 |
| N,N-dimethylformamide | 10 | 10 | 10 |
| TDI-diol reaction product | | 5% excess | |
| Properties: | | | |
| Density, pounds/ft.³ | 1.84 | 1.83 | 1.84 |
| Tensile strength, p.s.i. | 31.3 | 23.8 | 29.3 |
| Elongation, percent | 313 | 156 | 300 |
| Tear resistance, pounds/inch | 4.6 | 3.6 | 5.1 |
| Indentation load deflection, pounds/50 inches², at— | | | |
| 25% deflection | 31.9 | 46.0 | 30.8 |
| 65% deflection | 87.4 | 110.0 | 65.7 |

[1] See footnote 1 of Example 1, Table I.
[2] See footnote 2 of Example 1, Table I.
[3] A polyether diol prepared by reacting propylene oxide with dipropylene glycol to a hydroxyl number of 51 and then adding ethylene oxide to a hydroxyl number of 48.
[4] See footnote 3 of Example 1, Table I.

Example 4

Several reaction products were made from various proportions of tolylene diisocyanate and dipropylene glycol by procedures analogous to that described in Example 1. Flexible urethane foams were then produced from these reaction products by the hand batch, one-shot technique. The table below displays the molar ratio of tolylene diisocyanate (TDI) to dipropylene glycol (DPG), the viscosity of the reaction products, and representative properties of each foam. The foam formulation was the same as that shown in Table III above, except for the stannous octoate content. The polyol used was a 50–50 mixture of Polyol A and Polyol C except for the 4.5:1 reaction product which was foamed with a 50–50 mixture of Polyol A and Polyol B.

TABLE IV

| Molar Ratio of TDI:DPG | 2.75:1 | 3:1 | 3.5:1 | 4:1 | 4.5:1 |
|---|---|---|---|---|---|
| Viscosity of TDI:DPG reaction product, Brookfield cps. at 25° C | 47,700 | 11,900 | 1,440 | 400 | |
| Urethane foam: | | | | | |
| Parts of stannous octoate | 0.275 | 0.30 | 0.325 | 0.55 | 0.85 |
| Density, pounds/ft.³ | 2.19 | 2.06 | 1.94 | 1.84 | 1.72 |
| Tensile strength, p.s.i. | 31.2 | 29.8 | 30.9 | 31.3 | 21.7 |
| Elongation, percent | 220 | 251 | 256 | 313 | 215 |
| Tear resistance, lbs./inch | 6.02 | 6.3 | 4.93 | 4.6 | 4.2 |
| ILD,[1] lbs./50 inches²: | | | | | |
| 25% | 50 | 46.6 | 40.2 | 31.9 | 34.2 |
| 65% | 120.5 | 112.6 | 109 | 87.4 | 76.8 |

[1] ILD specimen size: 13″ x 13″ x 2″.

Examples 5 and 6

Tolylene diisocyanate-diol prepolymers were prepared from 2,2-dimethyl-3-hydroxypropyl 2,2-dimethyl-3-hydroxypropionate (Example 5) and from 2-methyl-2-hydroxymethylbutyl 2 - methyl - 2-hydroxymethylbutyrate (Example 6) by procedures analogous to that described in Example 1. The molar ratio of tolylene diisocyanate to diol was 4:1. The two prepolymers had the following properties:

TABLE V

| | Example 5 | Example 6 |
|---|---|---|
| Viscosity, cps. at 25° C | 480 | 240 |
| Free isocyanate (NCO), percent | 27.82 | 28.0 |

Urethane foams were prepared from the TDI-diol prepolymers by the one-shot method from the following formulation:

TABLE VI

| Component: | Parts by weight |
|---|---|
| Polyol A[1] | 50 |
| Polyol C[2] | 50 |
| Water | 4 |
| Bis[2-(N,N-dimethylamino)ethyl] ether | 0.2 |
| Stannous octoate | Varied |
| N,N-dimethylformamide | 10 |
| Emulsifier A[3] | 2 |
| TDI-diol prepolymer | 5% excess |

[1] See footnote 1 of Example 1, Table I.
[2] See footnote 3 of Example 3, Table III.
[3] See footnote 3 of Example 1, Table I.

The foams had the following properties:

TABLE VII

| | Example 5 | Example 6 |
|---|---|---|
| Stannous octoate, parts, by weight | 0.475 | 0.75 |
| Density, pounds/ft.³ | 1.99 | 1.92 |
| Tensile strength, p.s.i. | 29.8 | 25.6 |
| Elongation, percent | 327 | 257 |
| Tear strength, lbs./inch | 5.0 | 3.9 |
| 2-inch ILD, lbs./50 inch²: | | |
| 25% | 29.0 | 33.7 |
| 65% | 60.6 | 74.8 |

What is claimed is:

1. In a flexible urethane foam that is prepared by reacting a polyether polyol with an organic polyisocyanate in the presence of a foaming agent, the improvement which comprises using as said organic polyisocyanate the reaction product of tolylene diisocyanate with a diol, said diol being dipropylene glycol, tripropylene glycol, dibutylene glycol, 2,2-dimethyl-3-hydroxypropyl-2,2-dimethyl-3-hydroxypropionate, 2 - methyl - 2 - hydroxymethylbutyl 2-methyl-2-hydroxymethylbutyrate, or mixtures thereof, the molar ratio of said tolylene diisocyanate to said diol being within the range of from about 2:1 to about 6:1.

2. The flexible urethane foam of claim 1 wherein the polyether polyol is a polyoxyalkylene polyol having a hydroxyl number in the range of from about 40 to about 80.

3. The flexible urethane foam of claim 1 wherein said foaming agent is water.

4. The flexible urethane foam of claim 1 wherein said diol is dipropylene glycol.

References Cited

UNITED STATES PATENTS

| | | | |
|---|---|---|---|
| 3,072,582 | 1/1963 | Frost | 260—2.5 |
| 3,246,048 | 4/1966 | Holuska | 260—2.5 |
| 3,252,924 | 5/1966 | Mertes et al. | 260—2.5 |
| 3,264,233 | 8/1966 | Trescher et al. | 260—2.5 |

OTHER REFERENCES

Saunders et al.: Polyurethanes, part II (1964), pp. 117–119 cited of interest.

DONALD E. CZAJA, Primary Examiner

MICHAEL B. FEIN, Assistant Examiner

U.S. Cl. X.R.

260—453